Jan. 26, 1965  J. A. BACKMAN  3,167,099
LOOPING APPARATUS FOR FORMING LOOPS ON COIL SPRINGS
Filed Nov. 7, 1960  9 Sheets-Sheet 2

Inventor.
John A. Backman

United States Patent Office 3,167,099
Patented Jan. 26, 1965

3,167,099
LOOPING APPARATUS FOR FORMING LOOPS ON COIL SPRINGS
John A. Backman, Kenosha, Wis., assignor to Frank L. Wells Company, Kenosha, Wis., a corporation of Wisconsin
Filed Nov. 7, 1960, Ser. No. 67,802
12 Claims. (Cl. 140—103)

The invention relates in general to machines for making coil springs from a length of wire, and has reference in particular to a new and novel apparatus for automatically forming loops on the respective ends of the coil springs immediately following their formation.

The present invention may be considered as an attachment by way of an addition to a conventional coiling machine for further operations on the coil springs as formed by the conventional machine. The said additional operations consist in the formation of a loop at each end of the springs, the forming operations taking place simultaneously and in an automatic manner. Thus the looping attachment of the invention is operated in timed relation to the coiling machine and in a manner which synchronizes with the coiling operation and with the subsequent trimming of the coil springs to an accurate predetermined length.

An object of the invention is to provide apparatus which is new and novel in design and in operation, and which will automatically form loops on the respective ends of coil springs immediately following their formation and in timed relation with the conventional structure for producing the coil springs from a length of wire.

A further object of the invention is to provide loop forming apparatus for coil springs as herein described which will form a loop at each end of the coil simultaneously, wherein the end formations may include a machine the punch and die elements to and from each other, over loop, either open or closed and with or without overlap, and wherein the said loops at the ends of each coil spring may be the same, or they may differ.

Another object resides in the provision of loop forming apparatus for automatically producing loops on coil springs and which will be adjustable as regards the loop forming punch and die combination so that the end loops may lie in the same plane, or may be angularly displaced with respect to each other to lie in different planes. For this purpose the supporting plate which pivotally supports the actuating levers for the punch and die combination is rotatively adjustable in its housing, and when positioned for any particular orientation of the end loops, the said supporting plates are locked to their respective housing.

A further object is to provide a looping machine which will incorporate a cam having a predetermined shape and which produces actuation of the levers for moving the punch and die elements to and from each other, whereby to produce a loop by a precise bending of the last convolution at the end of the coil spring. As regards the present invention, the shape of the particular cam employed is related to its punch and die combination so as to produce a particular loop, and further each punch and die combination has a size which is predetermined by the size of the coil spring to be looped thereby.

A still further object of the invention is to provide a looping machine which will incorporate a carrier for the coil springs, the said carrier having synchronized indexing movements whereby the coil springs are individually picked up at the coiling point and presented to the punch and die elements of the looping machine, being resiliently held by the carrier until released and which takes place after the formation of the end loops thereon.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

Figure 1:
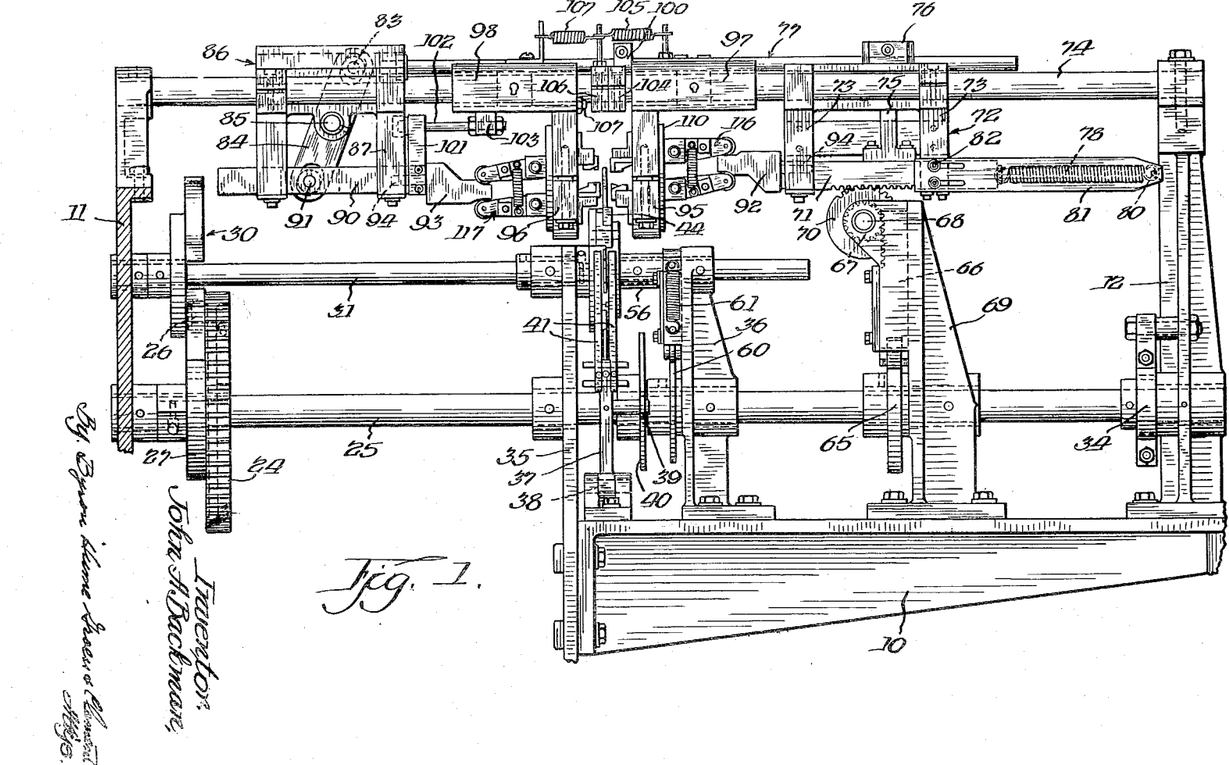
FIGURE 1 is an elevational view of the looping apparatus of the invention showing the several driving shafts and other operating elements for indexing the carrier and for actuating the punch and die members for forming the loops, the view illustrating that side of the apparatus opposite the coil forming mechanism.
Figure 2:
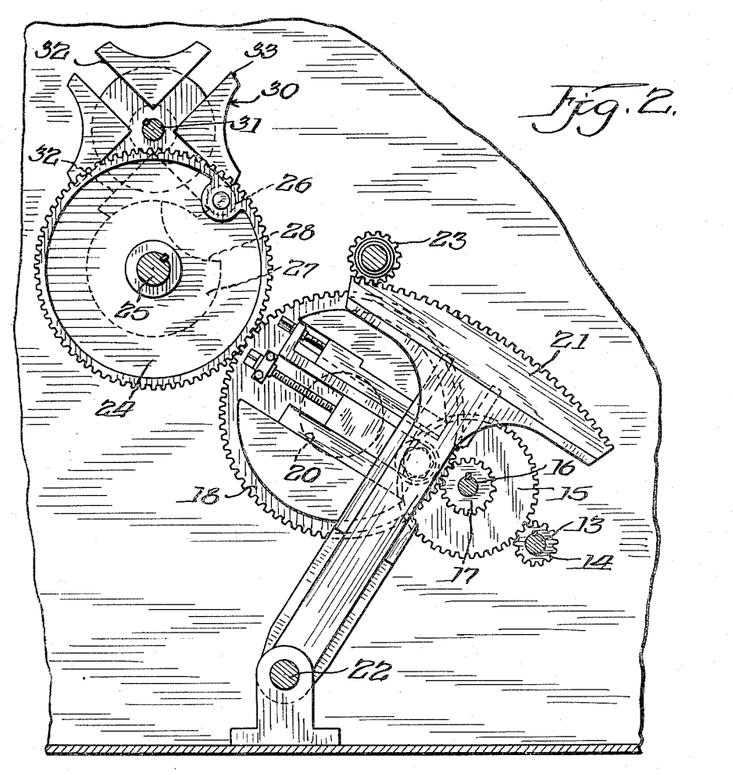
FIGURE 2 is a transverse sectional view through the apparatus showing the drive mechanism for the coil trimmer and the star wheel arrangement for indexing the carrier.

The looping apparatus selected for illustrating the present invention is illustrated in its entirety in FIGURE 1 wherein 10 indicates a suitable supporting base, and 11 and 12 indicate frame members at each end of the machine. The main power shaft 13 as shown in FIGURE 2 is provided with the pinion 14 which meshes with gear 15 on shaft 16. The pinion 17 on said shaft drives the gear 18 suitably fixed to shaft 20 and which provides the oscillating drive for gear segment 21 pivotally supported at 22. The segment in turn meshes with the pinion 23 which is part of the drive for the wire feeding rollers for the coiling mechanism. Since the invention is not concerned with the mechanism for coiling the springs, further description is not deemed necessary.

The gear 18 meshes with and drives the gear 24 on the main operating shaft 25 of the looping apparatus. Said gear is provided with the roller pin 26, and the concentric flange 27, the latter being formed with the arcuate recess 28. The roller pin 26 comprises the driving mechanism for the star wheel 30, fixed to shaft 31 and having the four guideways 32 which are disposed at ninety degrees with respect to each other. When the roller pin 26 enters a guideway, the star wheel 30 and shaft 31 are rotated one-fourth of a revolution, or ninety degrees, during which the terminal end of the members 33 enter the arcuate recess 28. The recess permits rotation of the star wheel, which is otherwise held against rotation by the flange 27. This intermittent rotation of shaft 31 functions to index the carrier for the coil springs, said carrier being shown in FIGURES 3 and 4. Accordingly, the coil springs are picked up following the coiling operation and the trimming thereof, and presented to the looping apparatus for the formation of a loop at each end.

Referring again to FIGURE 1, it will be seen that shaft 25 is journalled at its respective ends in the side frame members 11 and 12 with a friction brake 34 being associated with shaft 25, adjacent the frame 12. Intermediate journalling members 35 and 36 also serve to support shaft 25 for rotation, and said members in addition function to journal the indexing shaft 31. Shaft 31 is supported for rotation at its left hand end by the frame member 11. Member 36 may be moved on support 10 and bolted in adjusted position to accommodate the particular length of the coil spring to be looped by the present apparatus.

A kicker device is associated with the carrier and the same functions to remove the looped coil springs from the fingers of the carrier. The arm 37 is pivoted at 38 and a stud shaft fixed to the arm carries a roller 39 which engages the actuating cam 40 on shaft 25. A pair of spaced kicker arms 41 are fixed to the end of arm 37 and the same straddles the fingers of the carrier. The spacing of the kicker arms can be adjusted for different lengths of coil springs. Following a looping operation it will be understood that the carrier is indexed, and accordingly the carrier presents another coil spring to the punch and die combination for a looping operation thereon. Simultaneously the carrier removes the spring which has been looped and locates the same in front of the kicker arms 41. Since cam 40 is rotated in timed relation with the carrier, the arm 37 and thus the kicker arms 41 are oscillated to remove the looped coil spring from the front carrier fingers which are now open to permit such removal.

Figure 3:
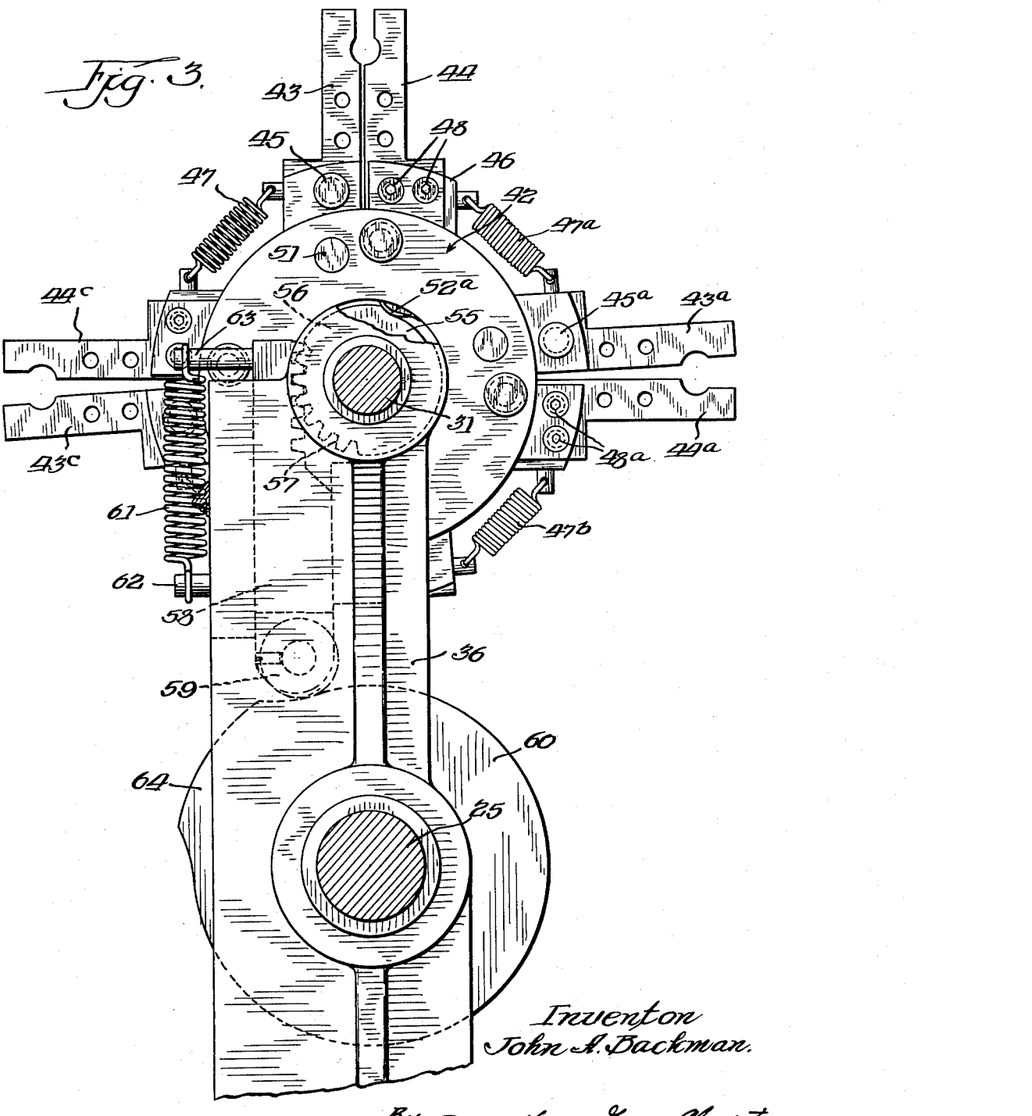
FIGURE 3 is a transverse sectional view showing the carrier in elevation and also showing the rack and pinion elements for actuating the fingers of the carrier.
Figures 4, 23, 24, 25, 26:
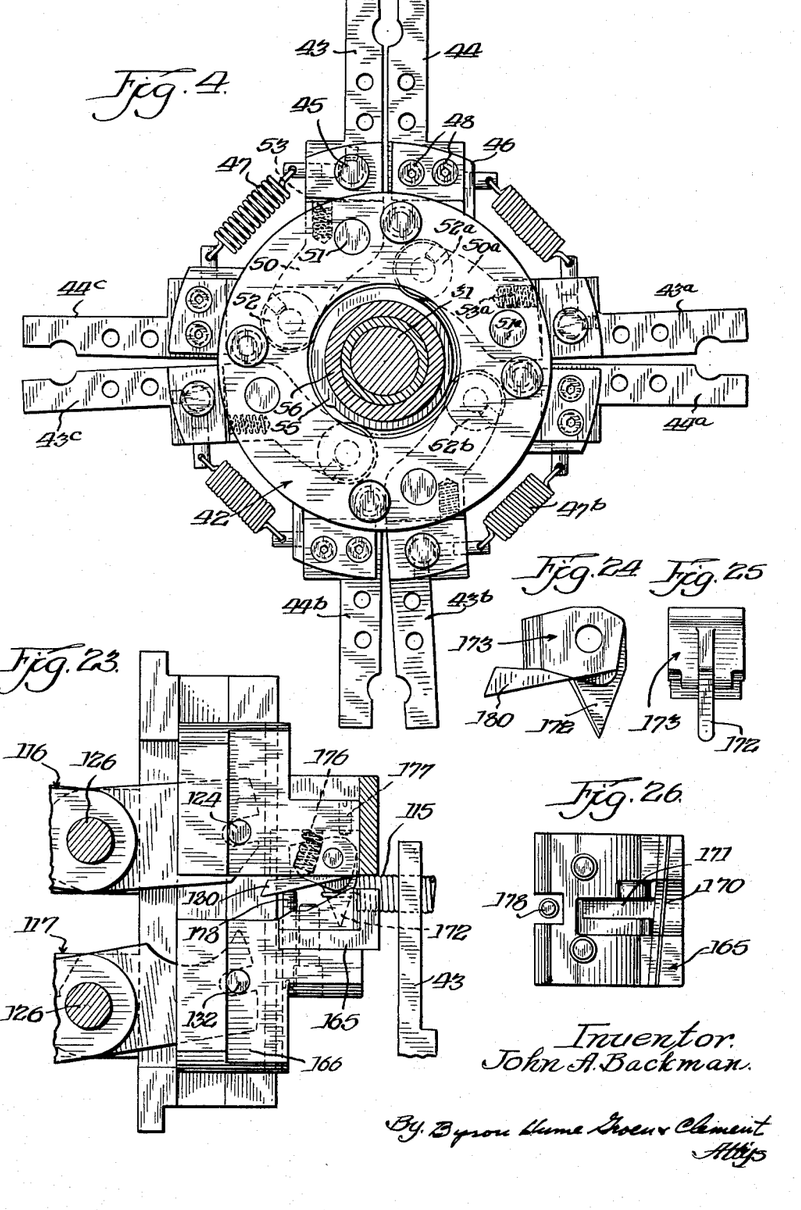
FIGURE 4 is a transverse sectional view also showing the carrier, but illustrating more praticularly the structural details of the fingers and their actuating cam levers and tensioning springs.
FIGURE 23 is a fragmentary sectional view similar to FIGURE 22 but showing an adjusted position of the punch for producing an extended machine loop.
FIGURES 24 and 25 are side and end views, respectively, of the pivoted punch as employed for the machine and extended machine loop.
FIGURE 26 is a plan view of the die as employed for the machine and extended machine loop.

The carrier of FIGURES 3 and 4 essentially consists of a disc 42 suitably fixed to shaft 31 so as to be indexed thereby. The fingers 43 and 44 of the carrier and the actuating levers 50 are associated with the disc 42 and with a cam 55 provided by a collar 56, FIGURE 1, having independent rotation on shaft 31. The collar is provided with a pinion section 57, FIGURE 3, and which has meshing relation with a vertically reciprocating rack 58 carrying at its lower end the roller 59. Said roller, in turn, rides on the periphery of cam 60 which is fixed to shaft 25. The rack 58 is tensioned in a downward direction by the coil spring 61, which is fixed at 62 and connects with the rack at its opposite end by means of the stud 63. The spring maintains the roller 59 in contact with cam 60 and the rack is given movement in an upward direction on each revolution of shaft 25 when the high point 64 and cam 60 contacts the roller. This upward movement of the rack rotates collar 56 and cam 55 to actuate the movable fingers of the carrier through action imparted to levers 50. It will be understood that actuation of the fingers takes place in synchronism with the indexing of the carrier.

The carrier is equipped with four pairs of fingers previously identified by the numerals 43 and 44. Since the fingers of each pair are identical, and since each pair is actuated in the same manner, only one pair will be described and the remaining pairs will be designated as 43a, 43b, etc. The finger 43 is movable, being pivoted at 45 to its particular lever 50. The coil spring 47 maintains the movable finger in open position, that is, annularly spaced from its associated finger 44 which is stationary, being fixed to the support 46 at 48. In closed position the movable finger 43 is disposed parallel to its stationary finger 44 and its opening and closing movement is effected by its lever 50 pivoted to the disc at 51 and carrying a roller 52 which has contact with the cam 55. When the high section of cam 55 is in contact with roller 52, the lever 50 is cammed outwardly and through the connecting coil spring 53, the lever 50 moves the finger 43 into a closed position against the tension of spring 47. The closed position of finger 43 is maintained until the roller 52 again contacts the low section of the cam 55.

All the actuating instrumentalities of the looping apparatus with the exception of the carrier are actuated by the shaft 25 through the cam 65, FIGURE 1. The cam produces reciprocating movement of the rack 66 which, in turn, drives the pinion 67 on shaft 68, the shaft being journalled by the supporting frame 69 which also supports the rack 66 for vertical movement. The shaft 68 has fixed thereto the gear 70 which meshes with a second rack 71 movably carried by and forming part of the stationary unit 72. Said unit 72 includes the end supports 73 which are fixed in adjusted position on the spaced horizontal supporting rods 74 so as to depend therefrom. The rods 74 extend from end to end of the apparatus being supported by the frame members 11 and 12, and thus the said supporting rods form an elevated structure from which is suspended the various elements of the looping apparatus. Said elements include the stationary unit 72, the purpose of which is to support the movable and horizontally disposed rack 71. Said rack 71 has fixed thereto the upright 75, which extends upwardly between the spaced rods 74 for connection at 76 with the movable rod 77. The rack 71 is tensioned in a direction toward the right by the coil spring 78, said spring being fixed at 80 to the strap member 81 and which are adjustably secured at 82 to the unit 72. The action of the movable rack 71 through the upright 75 produces reciprocating movements of the rod 77 in accordance with the action as initiated by the cam 65, and thus this action will also be in timed relation with the indexing movement of the carrier.

The movable rod 77 at its end adjacent frame 11 has a pivotal connection at 83 with the lever 84 which is pivotally supported at 85. The pivot pin 85 is supported by and forms part of another stationary unit 86, which is fixed to the spaced horizontal rods 74. The stationary unit 86 also includes end supports 87 which, as described, are fixed in adjusted position on the rods 74 and said unit also supports the movable member 90 to which the lower end of lever 84 is pivoted as at 91. The reciprocating movement of the movable rod 77 is transmitted through lever 84 to the member 90 and said member moves in a direction opposite to that of rack 71. It will be understood that member 90 and rack 71 not only have movement in opposite directions but the said movements take place simultaneously and to an equal extent. This movement of member 90 and rack 71 is utilized to produce the desired actuation of the actuating cams such as 92 and 93 and which will, in turn, actuate certain punch and die combinations as will be more particularly described. In order to permit the rotative adjustment of each punch and die combination, the actuating cams 92 and 93 are individually provided with a base pivot identified by numeral 94. The base pivot 94 for cam 92 is mounted for free rotation in an opening in rack 71. In a similar manner the base pivot 94 for cam 93 is mounted for free rotation in an opening in member 90. Thus each of the cams 92 and 93 is rotatable on an axis taken centrally through its pivot pin 94. Whatever may be the rotative adjustment of the punch and die, it will be understood that its particular actuating cam can be similarly adjusted, since the pivot axis 94 of the cam is on the same center as its particular supporting plate.

Figure 5:
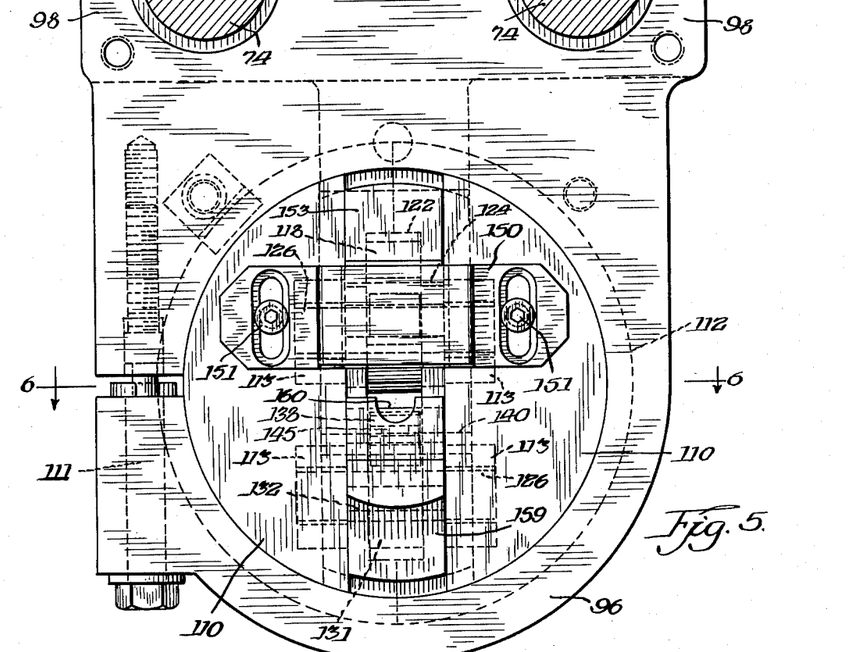
FIGURE 5 is an elevational view of a supporting plate which journals the actuating levers of a punch and die combination, the view showing the plate in locked position in its housing.

The spaced longitudinal rods 74 provide the supporting means for the slidable housings 95 and 96. Each housing is substantially annular, as best shown in FIGURE 5, and each housing is integral with a slidable collar structure identified by numeral 97 for the right hand housing 95, and by numeral 98 for the left hand housing 96, as clearly shown in FIGURE 1. The collars are each sufficiently wide for mounting in a slidable manner on both of the spaced rods 74, and thus each housing depends centrally below the spaced supporting rods. The collars, and the housing integral therewith, are slidable on the rods 74, since it is necessary for the housings to move away from each other and then toward each other. When the housings move apart the carrier is indexed for the release of the looped coil spring and for the entrance of the next coil spring to be looped. When the housings move toward each other to a predetermined extent, the looping operation is then initiated. This slidable movement of the housings is effected by the movable rod 77 by means of elements which are different for each housing. For housing 95 the rod 77 carries a member 100 which is fixed in proper adjusted position on the rod 77 and directly contacts the collar structure 97 for housing 95. For housing 96 the member 90 has an upright 101 fixed to the same and which projects vertically to receive the headed rod 102 suitably fixed at 103 to collar structure 98 for housing 96. A stop 104 is provided on rods 74 for housing 95 and which limits movement of the housing in a direction towards the left, FIGURE 1, the said housing 95 being yieldingly biased toward the stop by the coil spring 105. A similar stop 106 is provided on the rods 74 for housing 96 and which, through the fixed nut 107, limits movement of the housing in a right hand direction. Said housing 96 is resiliently biased towards its stop 106 by the coil spring 107. Both stops are adjustably fixed to the supporting rod 74. Even after the housings have engaged the stops, it will be understood that rod 77 may continue its movement toward the left, and such continued movement is necessary in order to cause the actuating cams 92 and 93 to enter between their actuating levers for actuating the punch and die combinations.

Figure 6:
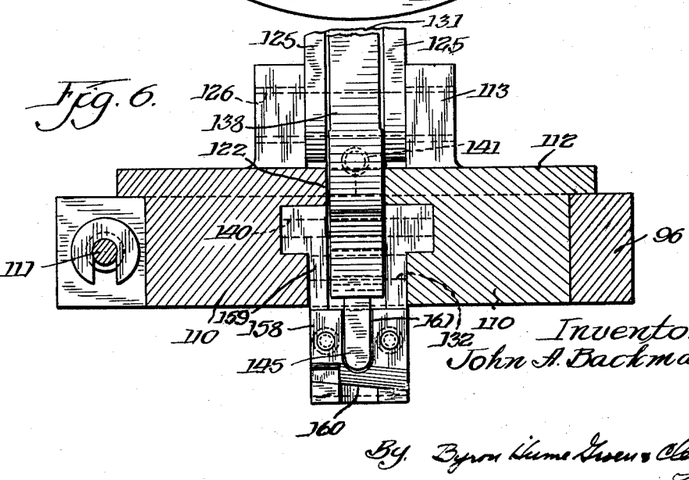
FIGURE 6 is a sectional view taken along line 6—6 of FIGURE 5.

As previously described, a supporting plate 110, FIGURE 5, is locked in adjusted rotative position by each housing. When it is necessary to adjust the rotative position of the plate 110, the threaded bolt 111 is released and the split housing opens to permit such rotative adjustment of its plate. Afterwards the bolt is tightened to lock the plate to the housing and with the circular flange 112 of the plate in contact with the housing all as shown in FIGURE 6. Journalling bosses 113 are integral with the plate 110 and thus provide the means for pivotally supporting the actuating levers for the punch and die combinations such as shown in FIGURES 7 to 23, inclusive.

Figure 7:
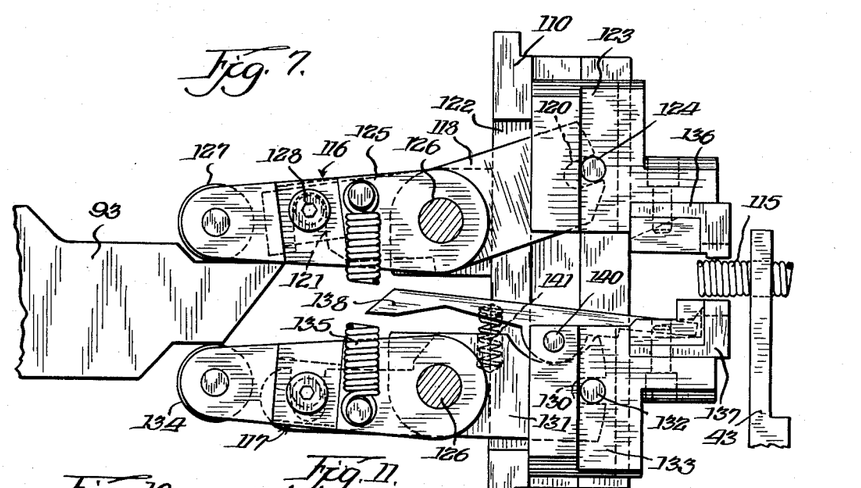
FIGURE 7 is a sectional view illustrating the cam and actuating levers for a punch and die combination for forming a side loop, the parts being illustrated with the punch and die in open position for receiving a coil spring from the carrier and prior to actuation of the parts by the cam.
Figures 8, 10, 11:
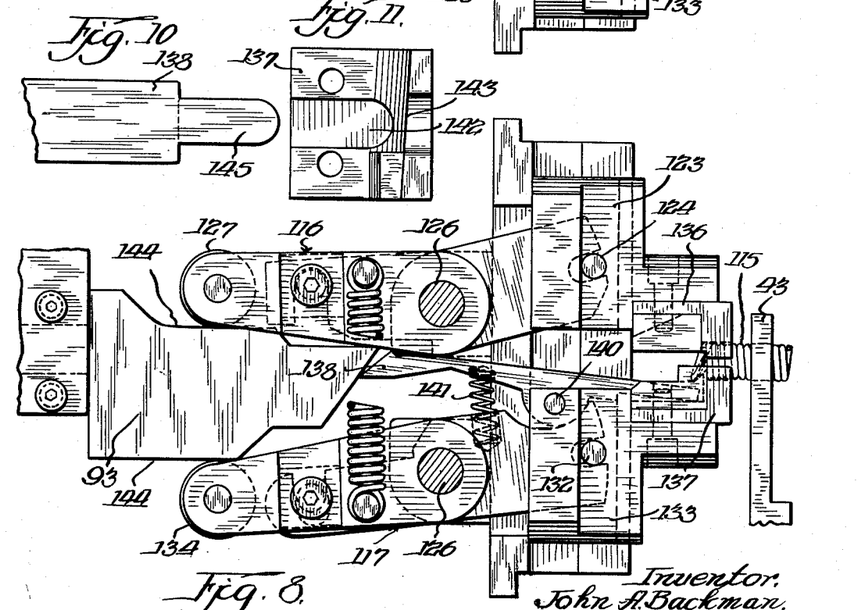
FIGURE 8 is a sectional view similar to FIGURE 7 but showing the first step in the forming of the side loop.
FIGURES 10 and 11 are plan views showing the paddle and punch, respectively, as employed for the side loop.
Figures 9, 12, 13, 14:
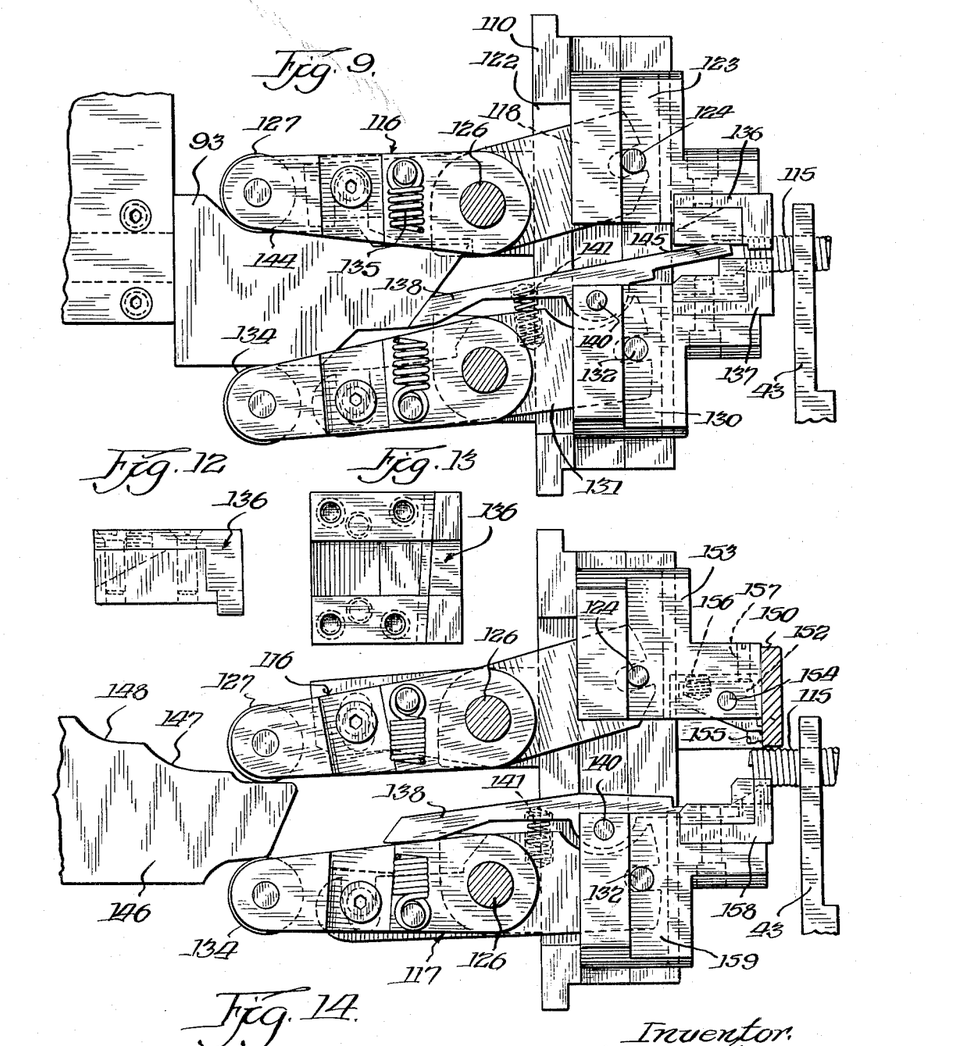
FIGURE 9 is a sectional view similar to FIGURE 8 but showing the next step in the formation of the side loop, and wherein the loop is bent to horizontal position by the paddle.
FIGURES 12 and 13 are side and plan views, respectively, of the die as employed for the side loop.
FIGURE 14 is a sectional view illustrating the cam and the actuating levers for a punch and die combination for forming a cross-over loop, the parts being shown in position prior to actuation thereof by the cam.
Figure 27:
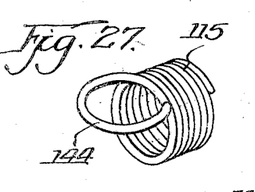
FIGURE 27 is a perspective view showing a side loop on one end of a coil spring.

A typical punch and die combination is shown in FIGURES 7, 8 and 9 in various stages of operation for the forming of a side loop as illustrated in perspective in FIGURE 27. The coil spring indicated by numeral 115 is presented to the punch and die elements by the fingers 43 and 44 of the carrier. At this time the fingers are closed for gripping the coil spring in a resilient manner so as not to damage the coil spring and the punch and die elements are open as shown in FIGURE 7. Also, it will be understood that the housings 95 and 96 are in contact with their respective stops to properly space the punch and die combinations for the particular length of the coil spring. Accordingly the cams 92 and 93 are about to be moved into the actuating levers 116 and 117 to effect an actuation of the punch and die elements. Considering first the top lever 116 for the die it will be seen from FIGURE 7 that said lever is formed by the bolting together of a plurality of members, one 118 having a slot 120 at its extreme right hand end and a second slot 121 in its lower side adjacent the opposite end. The member 118 extends through an opening 122 in the supporting plate 110 and the die holder 123 operatively connects with the member 118 by means of the pivot pin 124 which rides in the slot 120. The other part of the complete lever 116 comprises a pair of members 125 which straddle the member 118 and are pivoted by the pin 126 having journalling relation in the top journals 113 of the supporting plate. The members 125 also carry the roller 127 which contacts with the cam 93. The member 118 and members 125 are adjustably connected by the securing screw 128 which has location in the slot 121. The several members making up the top lever 116 are substantially repeated for the lower lever 117 except that the slot 130 of the center member 131 through the pin 132 has pivotal connection with a punch holder 133. Also, a roller such as 134 contacts with the cam 93 and the two levers 116 and 117 are tensioned by the coil spring 135 so as to maintain the rollers 127 and 134 in contact with cam 93 and also the holders in spaced relation as permitted by the cam. A die 136 is suitably fixed to the die holder 123 and a punch 137 is also fixed to the punch holder 133. The paddle 138 is pivoted at 140 to the punch holder 133 and said paddle is tensioned by the spring 141 to hold the operating end of the paddle within the recess 142 formed in the punch 137.

In operation of the structure shown in FIGURE 7 it will be understood that the punch 137 has a knife edge 143 FIGURE 11 disposed at an angle to accommodate the angle of the convolutions of the spring 115. The first step in forming the side loop of FIGURE 27 is shown in FIGURE 8 wherein the cam 93 has been moved inwardly to cause the high areas 144 to contact the rollers 127 and 134 thus separating the levers and closing the die and punch on the coil spring. The knife edge 143 splits the last convolution of the spring as illustrated in FIGURE 8 and separates the same so that the paddle 138 will engage the same. The next step shown in FIGURE 9 completes the formation of the loop 144 FIGURE 27 by the action of the paddle in bending the separated convolution into a horizontal position. This action of the paddle is made possible by the operating end 145 of the paddle which is shaped to lie in the recess 142 formed in the bottom wall punch 137.

The paddle is actuated by the cam 93 and immediately upon this bending action taking place the cams 92 and 93 are withdrawn by the retracting movement of the rack 71 and the member 90. Eventually the movable rod 77 will cause separating action of the housings 95 and 96 and the looped coil spring is now free of the die and punch so that an indexing movement of the carrier now occurs to place the looped coil spring in front of the kicker arms and to present another coil spring for a looping operation. Since the punch and die combinations supported by the housings 95 and 96 are identical the same kind of loop is formed on both ends of the coil spring and at the same time. Also, depending on the orientation of the supporting plates within the housings the two loops may be in the same plane or the loops may be so formed as to lie in different planes at an angle to each other.

Figure 15:
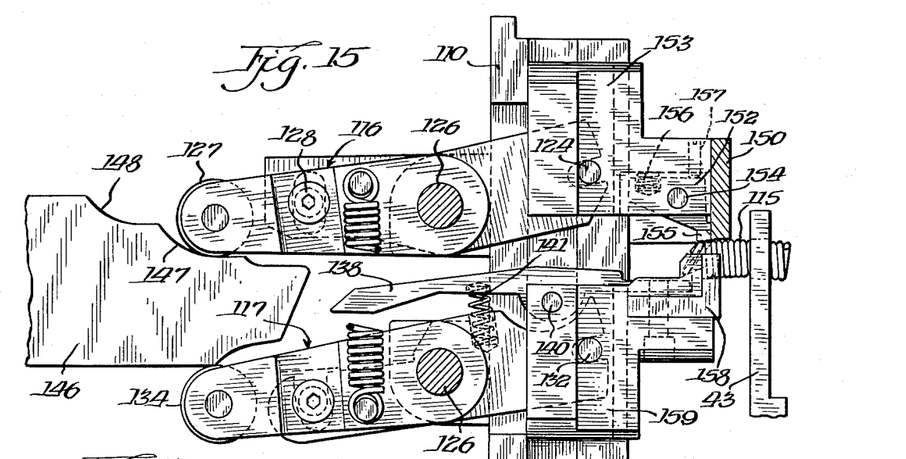
FIGURE 15 is a sectional view similar to FIGURE 14 but showing the first step in the formation of a cross-over loop.
Figures 16, 17, 18, 19, 20:
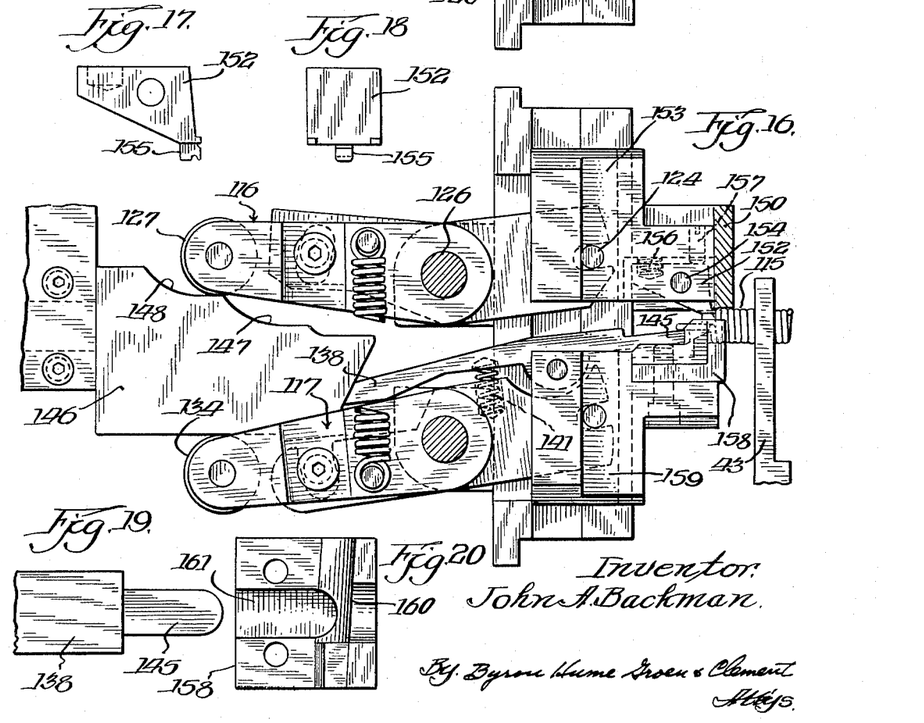
FIGURE 16 is a sectional view similar to FIGURE 15 but showing the next step in the formation of the cross-over loop, and wherein the paddle has bent the loop to a horizontal position.
FIGURES 17 and 18 are side and end views, respectively, of the die as employed for the cross-over loop.
FIGURES 19 and 20 are plan views of the paddle and punch as employed for the cross-over loop.
Figure 28:
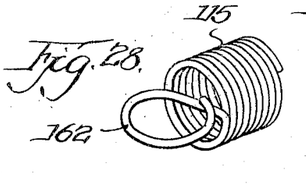
FIGURE 28 is a perspective view showing a cross-over loop.

The punch and die combination of FIGURES 5 and 6 is shown in various stages of operation in FIGURES 14, 15 and 16, and a cross-over loop 162 illustrated in FIGURE 28 is formed thereby. The construction of the levers 116 and 117 is the same as described for the side loop. However the cam 146 has a series of high cam formations 147 and 148 and, of course, the die and punch are different for forming this cross-over loop. Also a die holder bracket 150 is provided having an adjustable securement at 151 to the inside face of the supporting plate 110 as shown in FIGURE 5. The die 152, FIGURES 17 and 18, is pivoted within its holder 153 by the pin 154 and said die has a formed part 155 depending from its front end. The spring 156 maintains the said front end of the die against a stop 157 which can be adjusted to suit the pressure required to be applied against the coil spring 115. The punch 158 fixed to holder 159 as shown in FIGURES 19 and 20 is formed to provide a knife edge 160 and a recess 161 is also provided for receiving the operating end 145 of the paddle 138.

The coil spring 115 is presented to the spaced die 152 and punch 158 by the carrier and the first operation for bending the last convolution of the coil spring 115 is illustrated in FIGURE 15 wherein the cam 146 has entered between the levers 116 and 117 to cause the punch and die to move into contact with the coil spring with the punch splitting the last convolution and or possibly a convolution and a quarter depending on the overlap desired for the cross-over loop. This is an intermediate position of the cam 146 where it is in contact with roller 127 on the cam surface 147 and with the flat opposite surface in contact with roller 134. As cam 146 moves inwardly the cam surface 148 contacts the roller 127 and approximately simultaneously the cam itself contacts the paddle 138. The paddle is oscillated in a counter-clockwise direction against the spring 141 and also the part 155 is forced against the split convolution to a further extent. The action of the paddle end 145 and the part 155 is to bend the split convolution into a horizontal position while maintaining the loop approximately centrally of the remaining convolutions. The parts now assume the positions as shown in FIGURE 16 and the result is to form a cross-over loop 162 on the end of the spring 115.

Figure 21:
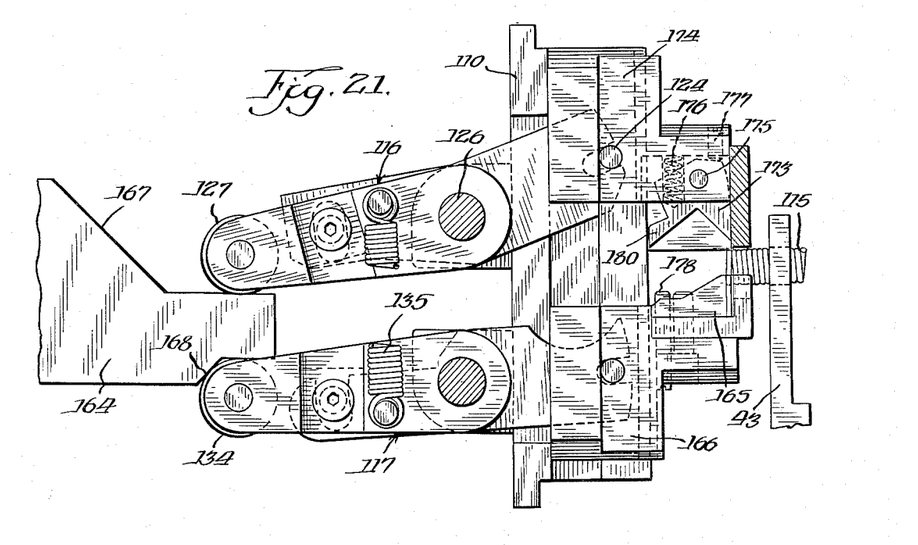
FIGURE 21 is a sectional view showing the cam and the actuating levers for forming a machine loop, the parts being shown in position prior to actuation thereof by the cam.
Figure 22:
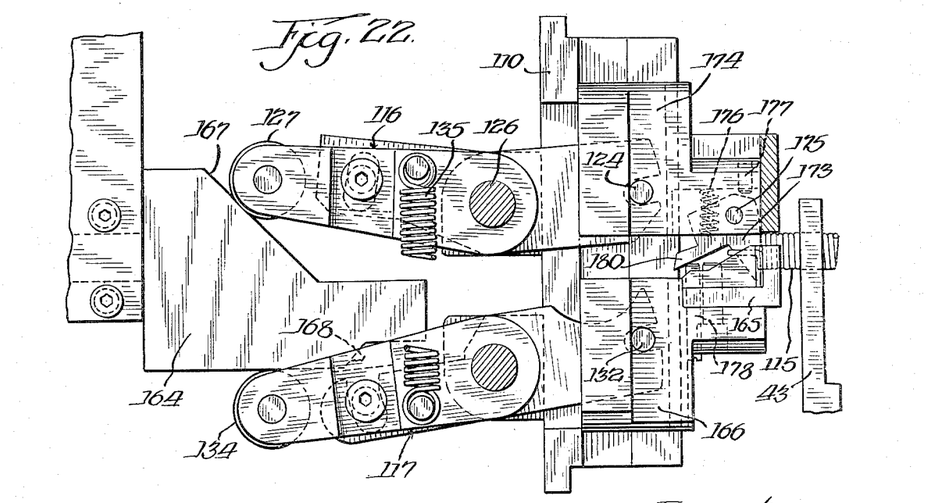
FIGURE 22 is a sectional view similar to FIGURE 21, but showing the parts in the position they assume at the completion of the machine loop operation.
Figure 29:
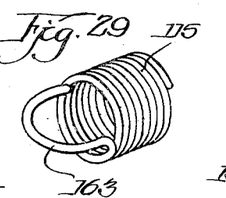
FIGURES 29 and 30 are perspective views showing a machine loop and an extended machine loop, respectively.

The machine loop 163 of FIGURE 29 is formed by the punch and die combination as shown in FIGURES 21 and 22. Here again, the construction of the levers 116 and 117 is the same as described for the side and cross-over loops and the only change as regards the elements of the combination concerns the cam 164, and, of course, the die 165 and the punch 173. It may be mentioned here that in order to obtain the desired relation between the die and the punch, the several members comprising the lever 116 have an adjustment which is somewhat different from the members comprising the levers 117. The cam 164 as shown in FIGURES 21 and 22 has an angular cam surface 167 which is adapted to engage with roller 127, whereas roller 134 contacts the opposite surface of the cam which is provided with a slightly different formation of cam surface 168. The die 165 fixed to the die holder 166 is best shown in FIGURE 26, wherein it will be observed that a convolution backing or support plate 170 is provided by the die and the same is disposed transversely of the die at an angle or inclination which coincides with that of the convolutions of the coil spring to be looped. The die is additionally provided with a recess 171 for receiving the pointed end 172 of the punch 173. The said punch 173 is pivoted within the punch holder 174 by means of the pivot pin 175. The coil spring 176 yieldingly biases the punch in a counter-clockwise direction so as to maintain the same in contact with the adjustable screw 177 having threaded relation in the punch holder 174. Another threaded screw is located in the die holder 166, namely the screw 178 and which coacts with the tab 180 of the punch to cause clockwise rotation thereof as the punch and die move toward each other.

In operation of the punch and die combination for forming a machine loop such as 163, FIGURE 29, it will be understood that the splitting of the last convolution of the coil spring 115 and the bending of the same into a horizontal plane is all effected by the pointed end 172 of the punch 173. The die 165 having the support plate 170 serves to support and back up the last convolution of the spring as the same is stripped and separated by the pointed end 172 and bent into horizontal position due to the angular shape of the said pointed end, all as clearly illustrated. As the punch moves toward the die the tab contacts the screw 178 and the punch is given slight degree of rotation in a clockwise direction. This can be adjusted by the position of the screw 178. Since the punch and its pointed end is the main instrumentality in the formation of the machine loop, it necessarily follows that most of the movement occurs with punch holder and punch and is effected by lever 116 by contact of roller 127 with the angular cam formation 167.

Figure 30:
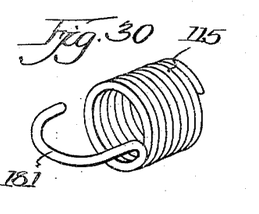

FIGURE 23 shows an adjustment for the threaded screw 178 whereby the punch 173 is effective for forming an extended machine loop such as 181, FIGURE 30. For such a loop the threaded screw 178 is elevated so that it has a closer relation to the punch and will thus be given a greater degree of clockwise rotation when the punch moves toward the die. The action of the pointed end 172 in such case is to strip the last convolution of the coil spring 115 and to bend the same horizontally, and further, by reason of the clockwise rotation, to effect a pull on the loop as thus formed whereby to open the same, thus producing what is termed an extended machine loop.

Upon the completion of the looping operation in each instance, it will be understood that the die and punch holders and thus the die and the punch move apart in a straight separating direction to free the coil spring 115. This is effected by a retracting movement of the cams caused by similar movement of the rack 71 and member 90. Movement of these members in a retracting direction is effected by the cam 65 on the main operating shaft 25, and as said retracting movement continues, the member 100 will contact collar structure 97 for housing 95 with the headed rod 102 being engaged by the upright member 101, this latter structure being associated with collar 98 for housing 96. Accordingly, the housings will be moved in opposite directions to separate the same, with the separating distance being predetermined by the length of the coil spring being operated on. When the housings have been separated to said predetermined extent, the carrier is then given an indexing movement in a counterclockwise direction, FIGURE 4. Thus the looped coil spring held by fingers 43 and 44 is moved forwardly and downwardly in front of the kicker arms 41, and a coil spring to be looped is picked up at the coiling point by the members 43a and 44a. Actuation of the fingers of the carrier to cause them to open and close at the proper times is effected by rotation of the collar 56 which is first rotated in a direction opposite to that of shaft 31 and then given return rotation to its original position at the completion of the indexing operation.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. Looping apparatus of the character described for looping each end of a coil spring, in combination, supporting structure including a pair of spaced horizontally disposed rods, a pair of housings slidably mounted on said rods and depending from the same, stops fixed to the rods between the housings, resilient means for urging each housing against its respective stops whereby the housings are spaced a predetermined distance, a reciprocable rod mounted between the spaced rods and operative to effect movement of the housings in a separating direction away from their stops, a supporting plate releasably fixed to each housing and having an adjusted rotative position, a punch and die combination carried by each supporting plate and located on the side thereof adjacent the other plate, each punch and die combination when actuated being operative to produce a loop on one end of a coil spring, a cam for each punch and die combination and located on the side of its supporting plate opposite its punch and die combination, each cam being movable to and from its supporting plate for actuating its punch and die combination, means connecting with said reciprocable rod for producing said movement of the two cams simultaneously and to an equal extent, and a carrier having indexing movement and being operably located between the two spaced housings, said carrier having gripping fingers for gripping and holding a coil spring and for presenting the same to the punch and die combinations by reason of its indexing movement.

2. Looping apparatus of the character described for looping each end of a coil spring, in combination, supporting structure including a pair of spaced horizontally disposed rods, a pair of housings slidably mounted on said rods and depending from the same, stops fixed to the rods between the housings, resilient means for urging each housing against its respective stop whereby the housings are spaced a predetermined distance, a reciprocable rod mounted between the spaced rods and operative to effect movement of the housings in a separating direction when moved in one direction and operative to permit the housings to move into contact with the stops when the rod is moved in the opposite direction, a supporting plate releasably fixed to each housing and having an adjusted rotative position, a punch and die combination carried by each supporting plate and located on the side thereof adjacent the other plate, each punch and die combination when actuated being operative to produce a loop on one end of a coil spring, actuating levers pivotally supported by each supporting plate on the side thereof opposite the punch and die, said levers effecting actuation of its punch and die when the levers are actuated, a cam located adjacent each supporting plate for actuating the levers thereof by movement of the cam to and from the levers, means connecting with said reciprocable rod for producing said movement of the two cams simultaneously and to an equal extent, and a carrier having indexing movement and being operatively located between the two spaced housings, said carrier having gripping fingers for gripping and holding a coil spring and for presenting the same to the punch and die combinations by reason of its indexing movement.

3. In apparatus for looping the respective ends of a coil spring, the combination with a pair of housings, of supporting means on which the housings are slidably mounted to depend in spaced axially aligned relation, stop means for spacing the housings a predetermined extent when the housings contact the stops means, a disc-like supporting plate carried by each housing in an adjusted rotative position, a pair of levers journalled by each supporting plate so that each pair extends through its plate and toward the other pair, a die operatively connected to one lever of each pair and said dies being located on the adjacent sides of the supporting plates, a punch operatively connected to the other lever of each pair and said punch being located on the same side of its supporting plate as its die, a cam for actuating each pair of levers, each cam having movement to effect alternate separating and closing action of that end of the levers opposite their die and punch, and means operating between the two spaced housings and having indexing movement for presenting coil springs to be looped to the die and punch combinations.

4. In apparatus for looping the respective ends of a coil spring, the combination with a pair of annular housings disposed in spaced axially aligned relation, a disc-like supporting plate provided by each housing so that the plates are in spaced parallel relation, a pair of levers journalled by each supporting plate in a manner whereby each pair extends through its plate and toward the other pair, a die operatively connected to one lever of each pair and said dies being located on the adjacent sides of the supporting plates, a punch operatively connected to the other lever of each pair and said punch being located on the same side of its supporting plate as its die, a cam for actuating each pair of levers, each cam having movement to effect alternate separating and closing action of that end of the levers opposite their die and punch, a reciprocable member for each cam for moving the cam, and each cam being rotatably supported by its reciprocable member in a manner permitting rotative adjustment of the cams with respect to the same axis that passes through the center of the aligned housings.

5. Apparatus for looping the respective ends of a coil spring as defined by claim 4, wherein the supporting plates are each releasably locked to its housing and wherein each plate may be adjusted as to its rotative position with respect to the axis passing through the center of the aligned supporting plates, whereby the orientation of the loops formed on the ends of the coil spring may be varied.

6. Apparatus for looping the respective ends of a coil spring as defined by claim 4, additionally including supporting means for slidably mounting the housings for movement towards and from each other, and wherein the supporting plates are each releasably locked in its housing, whereby each plate may be adjusted as to its rotative position in order to vary the orientation of the loops formed on the coil springs.

7. In apparatus for looping the respective ends of a coil spring, the combination with means providing a pair of horizontal, axially aligned supporting plates, said plates being disposed in spaced parallel relation, a pair of levers journalled by each supporting plate in a manner whereby each pair extends through its plate and toward the other pair, a die holder operatively connected to one lever of each pair and said die holders being located on the sides of the supporting plate which are adjacent each other, a punch holder operatively connected to the other lever of each pair and said punch holders being located on the same side of its supporting plate as its die holder, each lever including a central portion which extends through the supporting plate and to which the die or punch holder is operatively connected and a journalling portion which carries a roller at the end opposite the journalling axis thereof, means for securing the central portion and the journalling portion of each lever in adjusted position whereby the die and punch holders are spaced a predetermined distance for any particular spacing of the rollers, and resilient means connecting the journalling portions of each pair of levers to yieldingly bias the rollers thereof in a direction toward each other.

8. In apparatus for looping the respective ends of a coil spring as defined by claim 7, additionally including a housing for each supporting plate and which holds its supporting plate in an adjusted rotative position with respect to the horizontal axis passing through the center of the plates, a reciprocable cam for actuating each pair of levers by contacting the rollers of its pair of levers, and a member for effecting reciprocable movement of each cam and which carries its cam in a manner permitting rotative adjustment of its cam on said horizontal axis.

9. In apparatus for looping the respective ends of a coil spring as defined by claim 7, additionally including a housing for each supporting plate and which holds its supporting plate in an adjusted rotative position with respect to the horizontal axis passing through the center of the plates, supporting means for slidably mounting the housings for movement in directions towards and from each other, a reciprocable cam for actuating each pair of levers by contacting the rollers of its pair of levers, a member for effecting reciprocable movement of each cam and which carries its cam in a manner permitting rotative adjustment of its cam on said horizontal axis, and operating means for producing movement of the housings and movement of the cams in a synchronous manner.

10. In loop forming apparatus for coil springs, a supporting plate having a central aperture therein, a pair of levers journalled on one side of the plate and each having a portion extending through the aperture, a roller carried by each lever at its end adjacent the journalling axis, a die and a punch operatively connected to the end of the levers respectively which extend through the aperture, said punch having a knife edge for splitting the last convolution of a coil spring positioned between the die and punch when the parts are moved in a direction toward each other to a predetermined degree, and a paddle located between the levers and adapted to have pivotal movement following the splitting of the convolution for bending the split convolution into an extending position.

11. In loop forming apparatus for coil springs, a supporting plate having a central aperture therein, a pair of levers journalled on one side of the plate and each extending through the aperture, a roller carried by each lever at its end adjacent the journalling axis, a die holder and a punch holder operatively connected to the end of the levers respectively which extend through the aperture, a die carried by the die holder, a punch carried by the punch holder, a cam for actuating the levers by contacting the rollers whereby the levers are caused to oscillate, said punch having a knife edge for splitting the last convolution of a coil spring positioned between the die and punch when the parts are moved in a direction toward each other to a predetermined degree, and a paddle located between the levers and pivoted on the punch holder, said cam effecting pivotal movement of the paddle following the splitting operation for bending the split convolution into an extended position.

12. In loop forming apparatus for coil springs, a supporting plate having a central aperture therein, a pair of levers journalled on one side of the plate and each extending through the aperture, a roller carried by each lever at its end adjacent the journalling axis, a die holder and a punch holder operatively connected to the end of the levers respectively which extend through the aperture, a die carried by the die holder, a punch carried by the punch holder, a cam for actuating the levers by contacting the rollers whereby the levers are caused to oscillate, said punch having a pointed end and being pivotally mounted within the punch holder, said die having a recess therein for receiving the pointed end of the pivoted punch, whereby the pointed end splits the last convolution of a coil spring positioned between the die and punch when the parts are moved in a direction toward each other to a predetermined degree, a tab provided by the pivoted punch, and an adjustable screw carried by the die and adapted to contact the tab and rotate the pivoted punch following the splitting operation, whereby said pointed end can be rendered operative to effect a predetermined pull on the split convolution to form a loop of the desired character.

References Cited in the file of this patent

UNITED STATES PATENTS

| | | |
|---|---|---|
| 1,873,626 | Nigro | Aug. 23, 1932 |
| 1,947,449 | Anderson et al. | Feb. 20, 1934 |
| 2,527,325 | Myers | Oct. 24, 1950 |
| 2,971,545 | Shoemaker | Feb. 14, 1961 |

UNITED STATES PATENT OFFICE
CERTIFICATE OF CORRECTION

Patent No. 3,167,099                              January 26, 1965

John A. Backman

It is hereby certified that error appears in the above numbered patent requiring correction and that the said Letters Patent should read as corrected below.

Column 1, line 37, strike out "the punch and die elements to and from each other," and insert instead -- loop, an extended machine loop, a side loop, or a cross- --.

Signed and sealed this 1st day of June 1965.

(SEAL)
Attest:

ERNEST W. SWIDER
Attesting Officer

EDWARD J. BRENNER
Commissioner of Patents